Feb. 17, 1931.  D. O. JOHNSON  1,793,404
MEASURING INSTRUMENT
Filed April 24, 1928
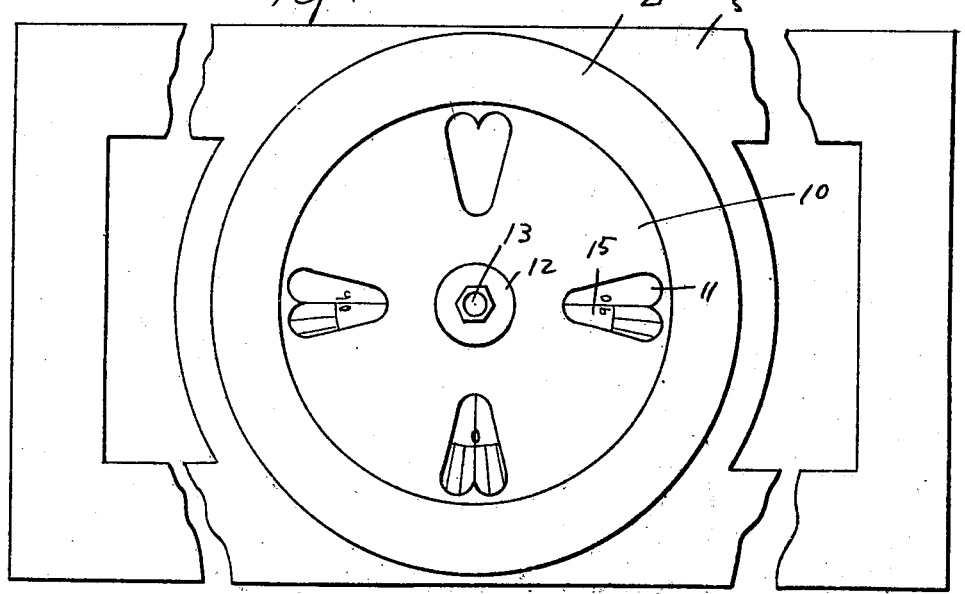
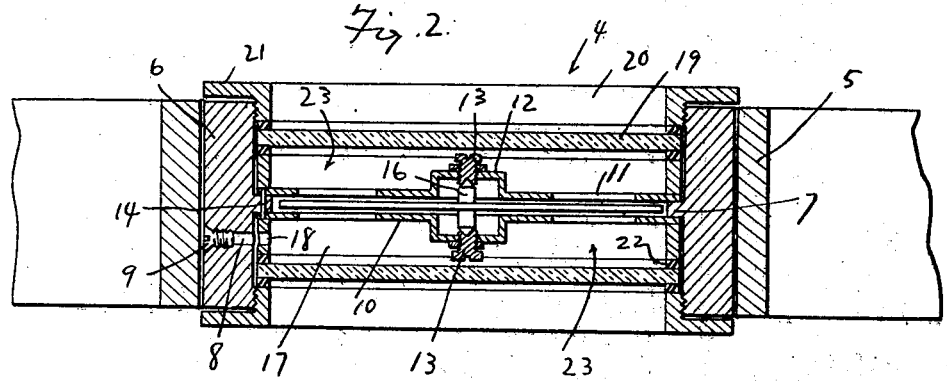
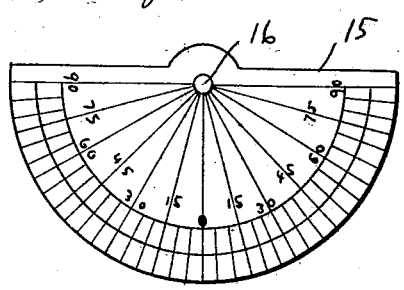
Inventor
Delbert O. Johnson
By Clarence A. O'Brien
Attorney Patented Feb. 17, 1931

1,793,404

UNITED STATES PATENT OFFICE

DELBERT O. JOHNSON, OF BLOOMINGTON, CALIFORNIA

MEASURING INSTRUMENT

Application filed April 24, 1928. Serial No. 272,446.

The present invention relates to an improved measuring instrument in the form of a gravity level which can be used like an ordinary spirit level or which may be employed to accurately determine pitch or angle of various surfaces and objects.

The invention has more particular reference to a gravity level which embodies a novel glass covered liquid container in which a graduated semi-circular indicator is mounted.

The particular details and their relative arrangement and association will serve to provide the new organization of parts and will become more readily apparent from the following description and drawings.

In the drawings:

Figure 1 is a top plan view with portions of the body broken away.

Figure 2 is a longitudinal sectional view, showing the complete assembly of the parts.

Figure 3 is a top plan view of the semi-circular graduated pendulous indicator.

The principal feature of novelty is, of course, the unit or device 4, which is removably mounted on the body 5. The body may be of any suitable construction. The unit, however, comprises a ring 6, having a centrally located flange 7 and having internal screw threads at its opposite ends.

On one side it is provided with a liquid filler opening 8, and a closing screw plug 9 therefor. This serves in a manner to be hereinafter described.

Associated with the flange 7 we find upper and lower disc like plates 10, provided with sight openings 11 as shown in Figure 1, provided with outwardly pressed cup portions 12. These cup portions carry removable fulcrum screws 13. A dowel pin 14 serves to fasten the plates to the flange, thus disposing them in close spaced relation. The semi-circular indicator 15 is disposed between these, the same having outstanding pointed journals 16, rotatably connected with bearing or fulcrum screws 13. Contacting the plates 10 we find a pair of spacing annuli 17, one of which is provided with a small port 18 in alignment with the aforesaid opening or filler passage 8. Cooperating with each annuli is a glass panel or lens 19, held in place by a retaining ring 20, this ring having an upstanding supporting flange 21. Interposed between the parts are suitable rubber gasket elements or rings 22. In this arrangement, liquid chambers 23 are formed on opposite sides of the indicator.

An appropriate liquid is introduced through the passage 8 and flows through the port 18 into the chambers or compartments 23, on both sides of the indicator, thus rendering the indicator susceptible to sensitive operations in order to expose the graduations through the sight openings 11 and the glass panel 19. Appropriate graduations will, of course be provided on the indicator, depending upon the character of work to be undertaken.

As before indicated, the device is a gravity level and is used similar to an ordinary liquid level. It may be also used for measuring inclination and angle. It is thought unnecessary, however, to detail the examples of use, since these will be evident to persons skilled in the art to which the invention relates.

Minor changes in shape, size, and rearrangement of parts coming within the field of invention claimed may be resorted to, without departing from the spirit of the invention or scope of the appended claim.

I claim:

In a measuring instrument, a ring having an internal annular flange intermediate the sides thereof, bearing plates, having sight openings therein, secured to the opposite sides of the flange and having centrally disposed, opposed oppositely extending cup-shaped portions providing journal housings, a semi-circular pendulous indicator located between the bearing plates and having journals mounted in said cup-shaped portions of the bearing plates, said indicator having graduations thereon to be viewed through the sight openings, spacing rings, glass closure plates cooperable with the spacing rings, and retaining screw rings fastened to the first mentioned ring and cooperable with the glass closure plates.

In testimony whereof I affix my signature.

DELBERT O. JOHNSON.